United States Patent
Johnson

Patent Number: 6,131,670
Date of Patent: Oct. 17, 2000

[54] ROTARY TILLER ATTACHMENT TO FACILITATE TOWING

[76] Inventor: John Travis Johnson, 821 GA Hwy. 128, Roberta, Ga. 31078

[21] Appl. No.: 09/439,171

[22] Filed: Nov. 29, 1999

[51] Int. Cl.[7] .................................................. A01B 35/28
[52] U.S. Cl. .......................... 172/681; 172/753; 172/776
[58] Field of Search ..................................... 172/681, 753, 172/776, 248, 43, 71

[56] References Cited

U.S. PATENT DOCUMENTS

| | | | |
|---|---|---|---|
| 4,591,001 | 5/1986 | Barbee | 172/43 |
| 4,725,068 | 2/1988 | Taylor et al. | 172/248 X |
| 5,168,692 | 12/1992 | Dudley | 56/328.1 |
| 5,520,253 | 5/1996 | Kesting | 172/125 |

*Primary Examiner*—Christopher J. Novosad

[57] ABSTRACT

An attachment kit with swiveling wheel for converting a self-propelled rotary tiller with rear tines and motor driven wheels into a towing machine. The attachment kit is secured to the tiller in place of the drag stake. A mounting bracket (8) allows for the assembly to be easily mounted to the rotary tiller without removing either tines (11) or the tine guard (12). The attachment kit with swiveling wheel (9) adds versatility and stability to the rotary tiller by converting it into a towing machine which can be used to tow many different types of trailers, nut harvesters, garden carts, etc. A towing tower (10a) and (10b) to facilitate towing a nut harvester easily connects to the attachment kit. The attachment kit also accepts ball-type hitches and drop-pin hitches.

1 Claim, 4 Drawing Sheets

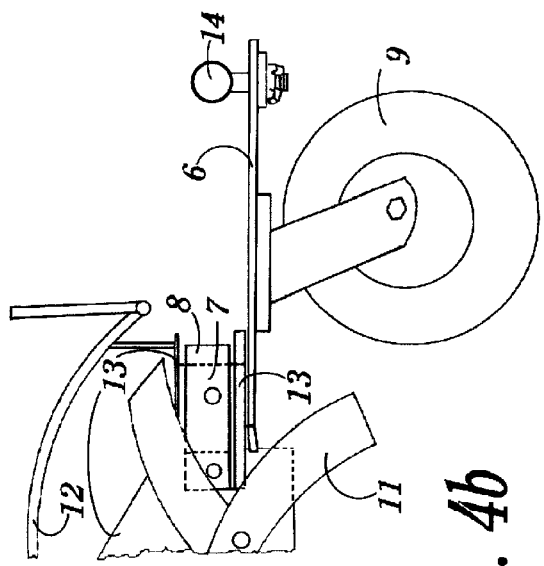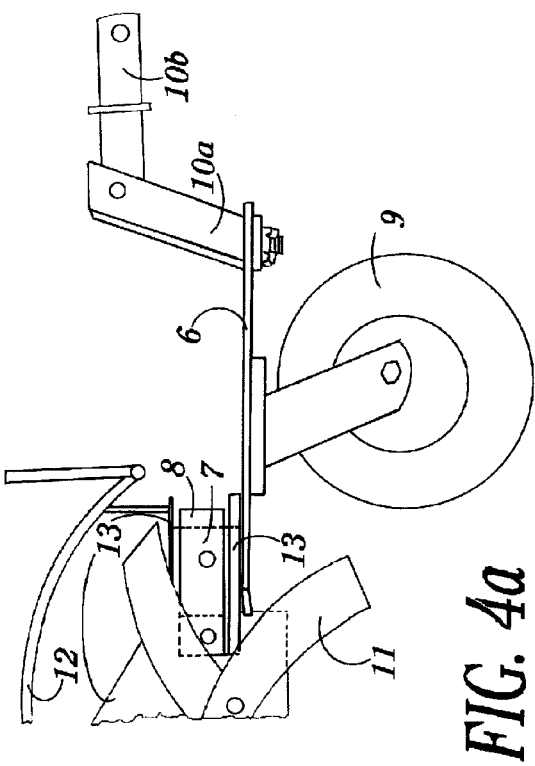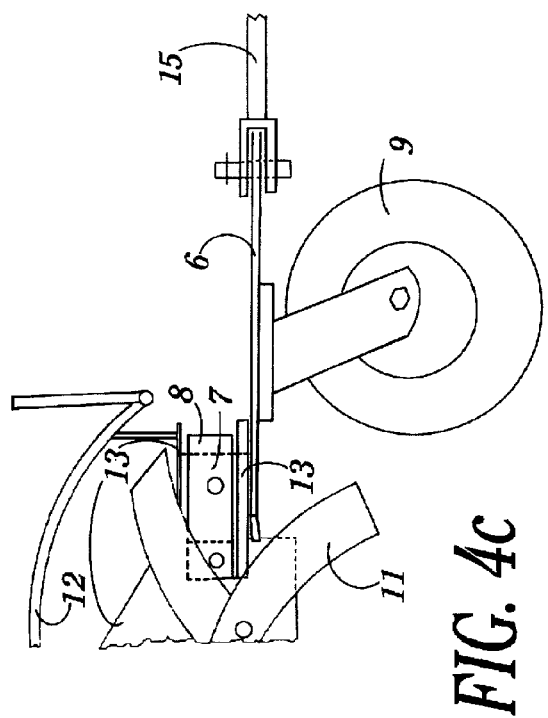

ROTARY TILLER ATTACHMENT TO FACILITATE TOWING

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

This invention relates to an attachment kit to convert a self-propelled, rotary tiller with rear tines and motor driven wheels into a towing machine. It also relates to a towing tower hitch for a nut harvester that easily connects onto the attachment kit.

The increasing popularity of home gardening has increased the demand for a simple, effective, and economical attachment kit for converting a rotary tiller into a light-duty towing machine for year-round duty. For a nominal cost, the tiller owner can have both a tilling machine, as well as, a towing machine for lightweight nut harvesters, garden carts, trailers, etc.

Such an attachment kit ideally should be easily and readily mountable and dismountable from the frame of the tiller and should effectively convert a self-propelled, rear tine, motor driven wheeled rotary tiller into a towing machine.

None of the rotary tillers of the prior art provide for an attachment kit with a swiveling wheel to convert the rotary tiller into an efficient and effective towing machine. For example, the rotary tiller disclosed in U.S. Pat. No. 5,520,253 to Kesting (1996) does not offer an attachment kit with a swiveling wheel for the purpose of pulling objects behind it. None of the eighteen applications this patent offers (tilling, grading, removing snow, shredding, edging, mowing, wet lands tilling, hard ground tilling, rolling, aerating, dethatching, scooping, lifting, cross country transporting, and automatic ixing and separating) apply to behind-the-rotary-tiller towing.

U.S. Pat. No. 4,591,001, Garden Tillers, to Barbee (1986) shows a toolbar attachment assembly, however, the assembly is expressly used for plows.

U.S. Pat. No. 5,168,692, Nut Harvesting Apparatus, to Dudley (1992) does not provide for an attachment kit with a swiveling wheel and towing tower for the purpose of pulling behind a rotary tiller. If the harvester is pulled by a tractor or riding lawn mower, the nuts are crushed into the ground before being harvested. The rotary tiller is lighter weight and prevents this problem.

SUMMARY

The invention obviates the problems associated with the prior art by providing an attachment kit with a swiveling wheel for converting a self-propelled rotary tiller with rear tines and motor-driven wheels into an easily maneuverable towing tiller. When the conversion kit is applied, the tines are held off the ground. This kit has a swiveling wheel which will rotate 360° when turning, backing, or going forward and provides increased stability when towing. The wheel also prevents the tongue of the item being pulled from dragging. The kit is easy to install with simple tools.

The attachment kit provides more versatility to the rotary tiller by allowing it to become a towing machine which would reduce the cost for capital outlay, maintenance, storage, and transportation of larger towing equipment. The kit would give the thousands of owners of selfpropelled rotary tillers another useful function for the tiller allowing them greater use throughout the year and not just at planting time. A tiller converted into towing machine would be able to go where large tractors and vehicles would not be able to go on the farm or garden.

The attachment kit is versatile enough to allow for drop-pin hitches, ball-type hitches, and a towing tower hitch for the nut harvester specified in U.S. Pat. No. 5,168,692. The towing tower hitch which mounts easily and quickly to the base of the attachment kit allows for the tiller to move independently from the nut harvester by swiveling at the base and up and down at the towing tongue. The tower is designed to hold the nut harvester at the appropriate height. The tiller is lighter weight than conventional lawn mowers or tractors that would normally pull the nut harvester, thereby, preventing the nuts from being crushed into the ground before being harvested.

Further objects and advantages of my invention will become apparent from a consideration of the drawings and ensuing description.

BRIEF DESCRIPTION OF THE DRAWINGS

FIG. 4a shows the conversion kit with the towing tower hitch for a nut harvester.

FIG. 4b shows the conversion kit with a ball-type hitch.

FIG. 4c shows the conversion kit ready to accept a drop hitch. Reference numerals in drawings are as follows:

Figure 1:
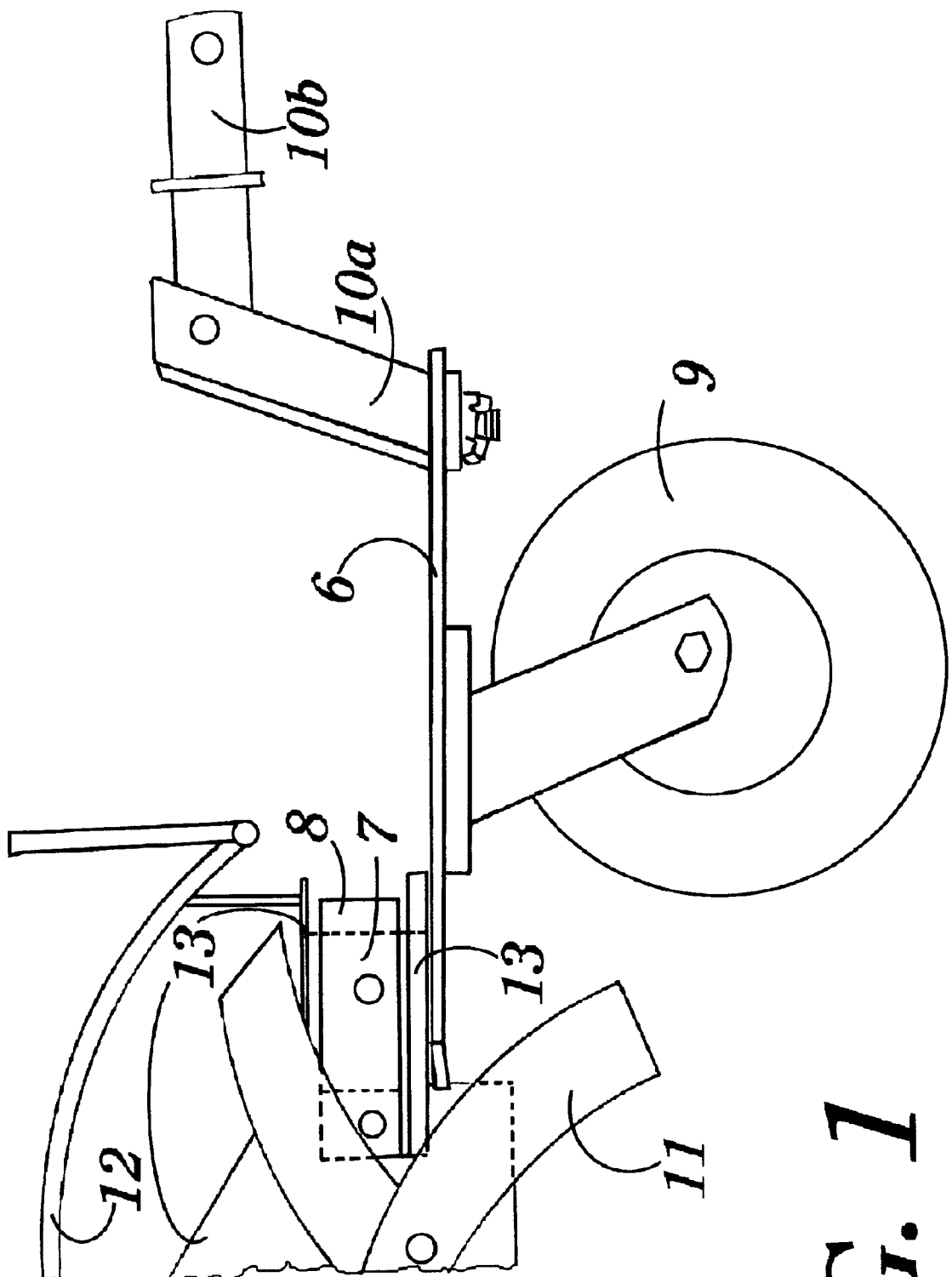
FIG. 1 is the perspective of a rotary tiller with rear tines and ground driven wheels with the conversion kit attached.

6 Base of conversion kit
7 Adapter plate
8 Mounting bracket
9 Swiveling wheel
10a Towing tower hitch base
10b Towing tower hitch tongue
10c Towing tower male-threaded bolt
11 Tines
12 Tine guard
13 Rear tiller hood bracket
14 Ball hitch
15 Drop-pin hitch

DESCRIPTION OF THE INVENTION

Figure 3:
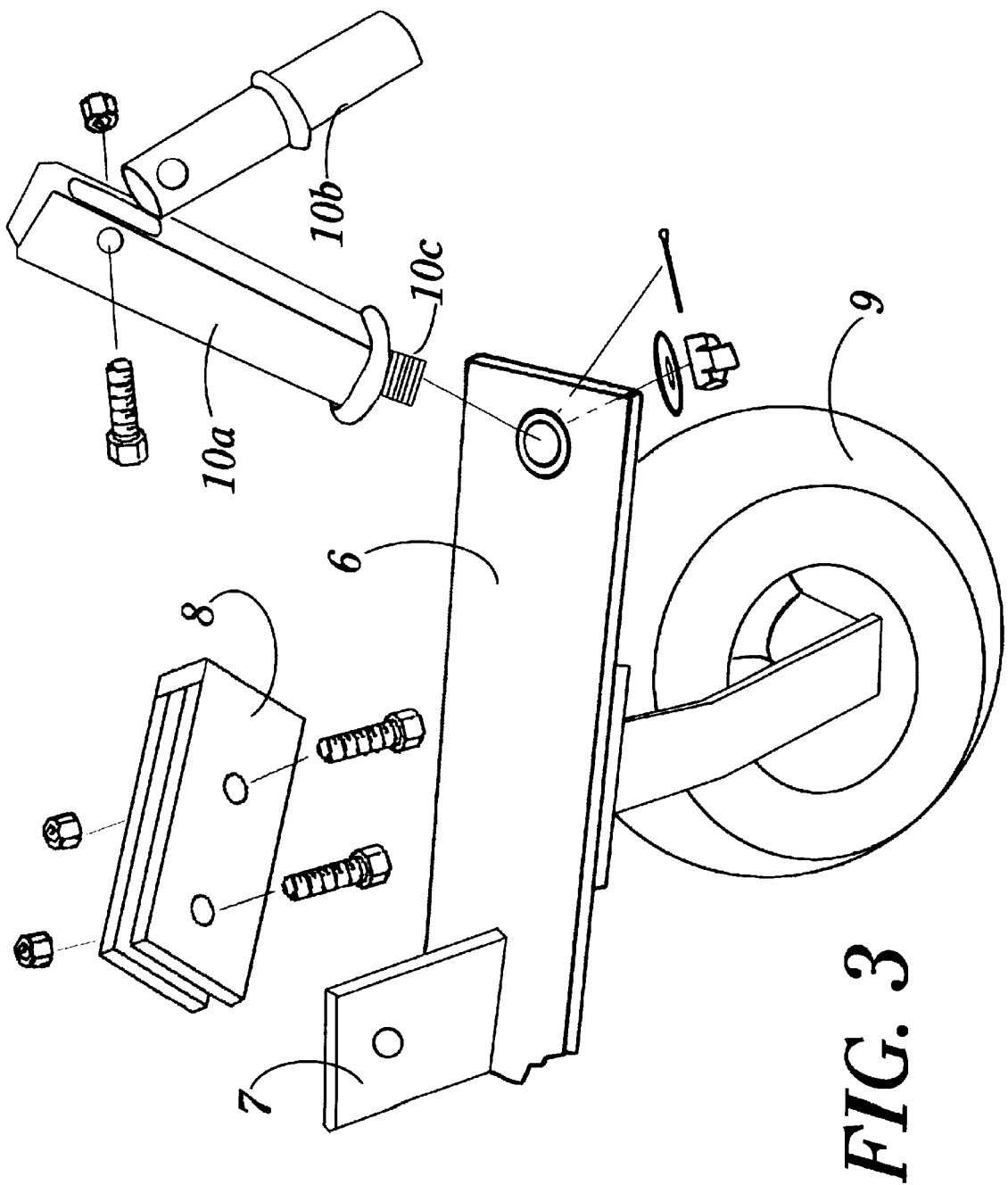
FIG. 3 shows the disassembled relationship parts of the conversion kit.

FIG. 3 shows an overall view of the parts of the conversion kit. The conversion kit comprises a base 6 on which an adapter plate 7 is mounted by welding. Adapter plate 7 has an Base 6 has a cutout on each side on the tiller end which allows for clearance between the tiller tines 11 and the attachment kit. On the opposite end of base 6 is an accessory hole for mounting towing attachments. A "U" shaped mounting bracket 8 mounts the adapter plate 7 to the tiller with two nuts and bolts. A 360° swiveling wheel 9 is attached to base 6 typically by welding. The towing tower in 10*a* and 10*b* is an adapter hitch for a nut harvester. Towing tower 10*a* is a square tube with a male-threaded bolt 10*c* welded securely at a 10° angle to the inside of the tube at the base end. Bolt end of towing tower 10*a* connects to base 6 with a washer and lock nut and a cotter pin. Top of towing tower 10*a* has an oblong slot for the towing tongue 10*b* to slide into. An off-centered hole is required on both sides to provide a hinging action on the tongue 10*b* so that the tongue will move up and down. Towing tongue 10*b* is typically connected to 10*a* by a bolt and nut.

Figure 2:
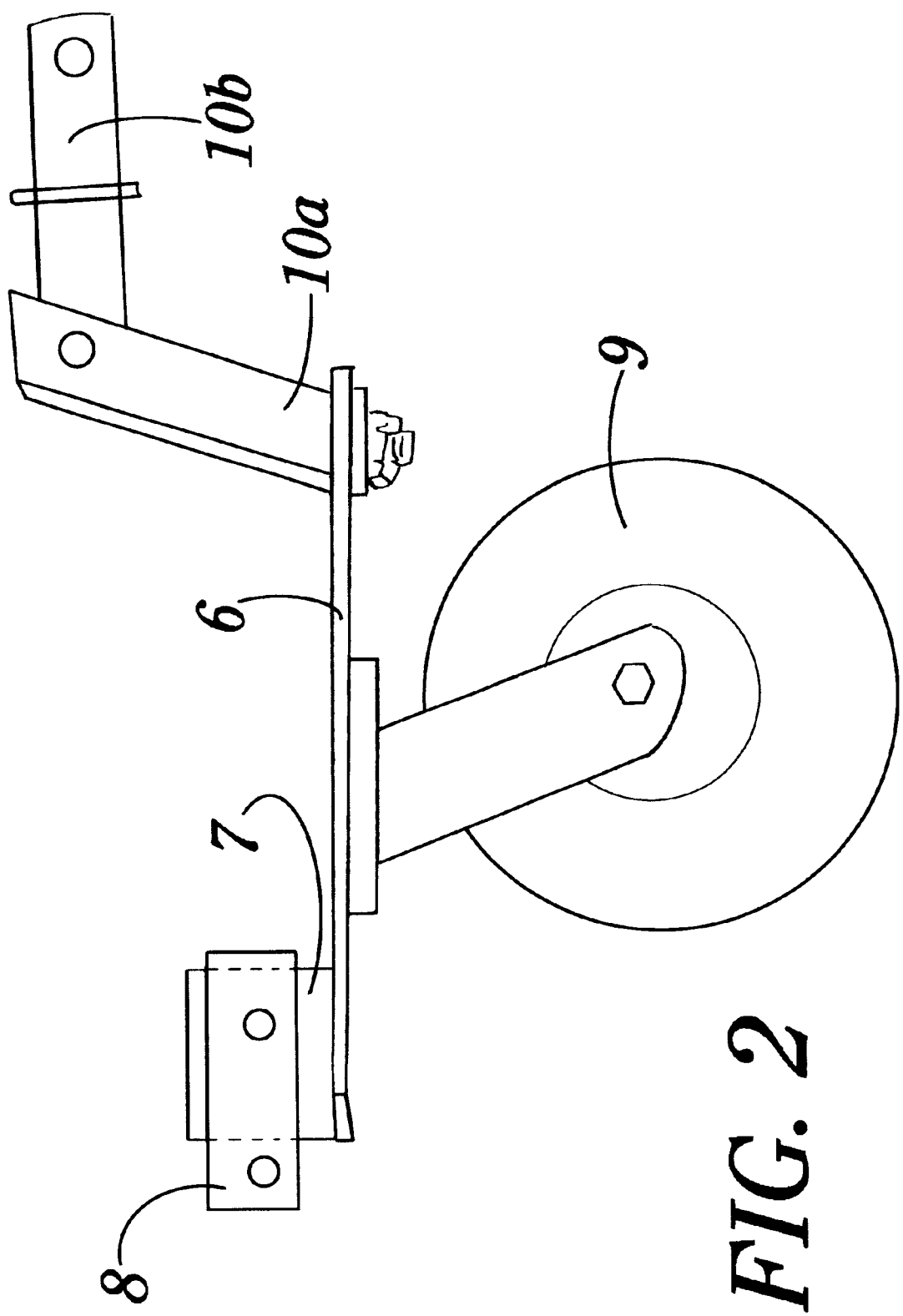
FIG. 2 is the assembled conversion kit with a towing tower hitch designed for the nut harvester application.

FIG. 1 shows the perspective of the tiller with the conversion kit connected. The tine guard 12 is lifted and the bolts fastening the drag bar to the depth regulator on the rotary tiller are removed first. Then the drag bar and the depth regulator bar are removed. The conversion kit is secured to the tiller in place of the drag bar. The adapter plate 7 on the conversion kit in FIG. 2 is mounted up into where the depth regulator was removed from the tiller. Then the mounting bracket 8 is attached around the adapter plate 7 and slid in until the holes in the bracket 8 are in line with the hole in the tiller bar on the rear tiller hood bracket 13 and secured with a nut and bolt. The hole in the adapter plate 7 is aligned with the rear hole in the mounting bracket 8 and secured with a nut and bolt.

The mounting bracket 8 allows for the assembly to be attached without removing either the tines 11 or the tine guard 12. The base plate 6 under the adapter plate 7 has a cutout on each side of tiller end to allow the tines 11 to rotate on those models of tillers without power take off (PTO) control.

The swivel wheel 9 automatically holds the tines off the ground and allows the tiller to move forward, backward and to turn left or right. The swivel wheel also balances the load and provides more stability to whatever is being towed and prevents dragging.

This conversion kit is capable of towing a lightweight nut harvester by means of a towing tower hitch 10*a* and 10*b*. This towing tower hitch allows for the tiller to move independently from the nut harvester by swiveling at the base 10*a* and up and down at the towing tongue 10*b*. The towing tower is designed to hold the nut harvester at the correct height. The towing tower 10*a* is connected to the base 6 by inserting the male-threaded bolt end 10*c* of the towing tower 10*a* through the hole on the base 6 and secured with a washer and nut and a cotter pin.

This conversion kit also allows for a ball-type hitch 14 or drop-pin hitch 15 to be attached in order to tow garden carts, trailers, planters, fertilizer distributors and anything else that the rotary tiller can pull.

CONCLUSION, RAMIFICATIONS, AND SCOPE OF INVENTION

Thus the reader will see that the conversion kit of the invention provides a simple, effective, and economical attachment kit for converting a rotary tiller into a light-duty towing machine for year-round use. For a nominal cost, the tiller owner can convert his tilling machine into a towing machine for many different applications that can be used year round. The towing tower provides for a practical and efficient way to pull nut harvesters without damaging the nuts.

While my above description contains many specificities, these should not be construed as limitations on the scope of the invention, but as merely providing illustrations of some of the presently preferred embodiments of this invention. Many other variations are possible. For example, the mounting bracket may be made in two pieces, the entire attachment kit can be painted any color, locking pins may be substituted for bolts and nuts, the holes can be different shapes, the notches in the adapter plate can have other shapes, and the swiveling wheel can be of a different size. This towing attachment kit can be used to tow planters, fertilizer spreaders, nut harvesters, garden carts and any other lightweight items that need to be towed.

Accordingly, the scope of the invention should be determined not by the embodiments illustrated, but by the appended claims and their legal equivalents.

The embodiments of the invention in which an exclusive property or privilege is claimed are defined as follows:

1. An article of equipment for use on wheel-powered, rear-tine tillers for holding and coupling towed equipment comprising:
    a. a configuration of rigid steel of sufficient size and shape to accommodate attaching, coupling, and supporting;
    b. a plurality of elongated support members of unequal lengths;
    c. said elongated support members being joined normally or at right angles to a top and an underside at spaced locations able to support a mounting base;
    d. said elongated support may be constructed into various shapes including "U," flat, or syncline;
    e. said mounting fundus (base) are mounted on top of a swiveling caster and wheel;
    f. said fundus and swiveling wheel support tiller tines off the ground for towing and turning;
    g. said fundus has a mortise on two sides at a front and a hole in the rear.

* * * * *